United States Patent
Kim et al.

(10) Patent No.: US 7,492,421 B1
(45) Date of Patent: *Feb. 17, 2009

(54) CASE FOR LIQUID CRYSTAL DISPLAY

(75) Inventors: Byoung Ku Kim, Kumi-shi (KR); Se Chang Won, Kumi-shi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/277,356

(22) Filed: Mar. 26, 1999

Related U.S. Application Data

(63) Continuation-in-part of application No. 09/145,357, filed on Sep. 1, 1998, now Pat. No. 5,926,237, which is a continuation of application No. 08/888,164, filed on Jul. 3, 1997, now Pat. No. 5,835,139.

(30) Foreign Application Priority Data

Apr. 22, 1998 (KR) .................................. 98-14409
Sep. 15, 1998 (KR) .................................. 98-38118

(51) Int. Cl.
*G02F 1/1333* (2006.01)
(52) U.S. Cl. ...................................................... 349/58
(58) Field of Classification Search ................... 349/58; 361/681
See application file for complete search history.

(56) References Cited

U.S. PATENT DOCUMENTS

| | | | |
|---|---|---|---|
| 4,111,533 A | 9/1978 | Nakamura et al. | |
| 4,422,728 A | 12/1983 | Andreaggi | |
| 4,448,565 A | 5/1984 | Peterson | |
| 4,755,035 A | 7/1988 | Kopish et al. | |
| 4,781,422 A | 11/1988 | Kimble | |

(Continued)

FOREIGN PATENT DOCUMENTS

DE   297 12 775 U1   9/1997

(Continued)

OTHER PUBLICATIONS

"Nikkei Microdevice Special Issue Flat Panel Display 1997", Dec. 12, 1996 at p. 49.

(Continued)

*Primary Examiner*—James A Dudek
(74) *Attorney, Agent, or Firm*—McKenna Long & Aldridge, LLP

(57) ABSTRACT

A flat panel display device uses a side mounting method to hold a flat panel display. In particular, the flat panel display device has an outer casing having at least one side wall, a frame that supports a liquid crystal display panel and has at least one side panel, a top case configured to engage the frame with the liquid crystal panel therebetween and a bracket disposed between the side panels of the frame and the top case. The top case has at least one side panel and the side panel defines an opening. The bracket has a projecting part configured to be fitted in the opening of the side panel of the top case. The frame is secured to the side wall of the outer casing with a fastener coupled to the bracket through the outer casing.

35 Claims, 10 Drawing Sheets

U.S. PATENT DOCUMENTS

| | | | |
|---|---|---|---|
| 4,796,977 A | 1/1989 | Drake | |
| 4,937,709 A | 6/1990 | Yanagi et al. | |
| 4,959,887 A | 10/1990 | Gruenberg et al. | |
| 5,002,368 A | 3/1991 | Anglin | |
| 5,102,084 A | 4/1992 | Park | |
| 5,103,377 A | 4/1992 | Kobayashi et al. | |
| 5,168,426 A | 12/1992 | Hoving et al. | |
| 5,173,837 A | 12/1992 | Blackwell et al. | |
| 5,195,213 A | 3/1993 | Ohgami et al. | |
| 5,233,502 A | 8/1993 | Beatty et al. | |
| 5,238,421 A | 8/1993 | Kobayashi | |
| 5,253,142 A | 10/1993 | Weng | 361/680 |
| 5,264,992 A | 11/1993 | Hogdahl et al. | |
| 5,268,816 A | 12/1993 | Abell, Jr. et al. | |
| 5,268,817 A | 12/1993 | Miyagawa et al. | |
| 5,276,589 A | 1/1994 | Bartlett et al. | |
| 5,313,318 A | 5/1994 | Gruenberg et al. | |
| 5,328,379 A | 7/1994 | Kobayashi | |
| 5,363,227 A | 11/1994 | Ichikawa et al. | |
| 5,379,187 A | 1/1995 | Fujimoto et al. | |
| 5,422,751 A | 6/1995 | Lewis et al. | |
| 5,432,626 A | 7/1995 | Sasugar et al. | |
| 5,467,106 A | 11/1995 | Salomon | |
| 5,479,285 A | 12/1995 | Burke | |
| 5,486,942 A | 1/1996 | Ichikawa et al. | |
| 5,494,447 A | 2/1996 | Zaldan | |
| 5,504,605 A | 4/1996 | Sakuma et al. | |
| 5,559,670 A | 9/1996 | Flint et al. | |
| 5,566,048 A | 10/1996 | Esterberg et al. | |
| 5,568,357 A | 10/1996 | Kochis | |
| 5,570,267 A | 10/1996 | Ma | |
| 5,619,351 A | 4/1997 | Funamoto et al. | |
| 5,634,351 A | 6/1997 | Larson et al. | |
| 5,636,101 A | 6/1997 | Bonsall et al. | |
| 5,636,102 A | 6/1997 | Fujino et al. | |
| 5,644,516 A | 7/1997 | Podwalny et al. | |
| 5,654,779 A | 8/1997 | Nakayama et al. | |
| 5,666,172 A | 9/1997 | Ida et al. | |
| 5,680,183 A | 10/1997 | Sasugar et al. | |
| 5,682,645 A | 11/1997 | Watabe et al. | |
| 5,717,566 A | 2/1998 | Tao | |
| 5,771,539 A | 6/1998 | Wahlstedt et al. | |
| 5,777,704 A | 7/1998 | Selker | |
| 5,815,225 A | 9/1998 | Nelson | |
| 5,825,613 A | 10/1998 | Holden | |
| 5,835,139 A | 11/1998 | Yun et al. | 349/58 |
| 5,872,606 A | 2/1999 | Kim | |
| 5,905,550 A | 5/1999 | Ohgami et al. | |
| 5,926,237 A | 7/1999 | Yun et al. | |
| 6,002,457 A | 12/1999 | Yun et al. | |
| 6,002,582 A | 12/1999 | Yeager et al. | |
| 6,020,942 A | 2/2000 | Yun et al. | |
| 6,064,565 A | 5/2000 | Ishihara et al. | |
| 6,144,423 A | 11/2000 | Kim | |
| 6,304,432 B1 | 10/2001 | Kim | |
| 6,330,148 B1 | 12/2001 | Won et al. | |
| 6,373,537 B2 | 4/2002 | Yun et al. | |
| 6,411,501 B1 | 6/2002 | Cho | |
| 6,498,718 B1 | 12/2002 | Kim et al. | |
| 6,501,641 B1 | 12/2002 | Kim et al. | |
| 6,512,558 B2 | 1/2003 | Kim | |
| 6,618,240 B1 | 9/2003 | Kim | |
| 6,693,794 B2 | 2/2004 | Kim | |
| 6,838,810 B1 | 1/2005 | Bovio et al. | |
| 2003/0189681 A1 | 10/2003 | Han et al. | |

FOREIGN PATENT DOCUMENTS

| | | |
|---|---|---|
| DE | 41 20 950 | 11/1998 |
| EP | 0 425 793 | 5/1989 |
| EP | 1 052 536 A3 | 1/1991 |
| EP | 0 454 120 | 5/1991 |
| EP | 0 317 261 | 12/1992 |
| EP | 0 587 144 | 3/1993 |
| EP | 0532284 | 3/1993 |
| EP | 0532284 A1 | 3/1993 |
| EP | 0 604 872 | 3/1994 |
| EP | 0 620 473 | 7/1994 |
| EP | 0 880 049 A1 | 2/2001 |
| GB | 2 305 689 | 10/1994 |
| GB | 2 305 690 | 4/1997 |
| GB | 2319110 | 5/1998 |
| JP | S52-045367 | 9/1977 |
| JP | S62-137479 | 2/1984 |
| JP | S62-269931 | 8/1987 |
| JP | H01-094983 | 11/1987 |
| JP | H01-059223 | 4/1989 |
| JP | H01-211721 | 4/1989 |
| JP | H03-006670 | 4/1989 |
| JP | H01-237591 | 9/1989 |
| JP | H02-079893 | 3/1990 |
| JP | H02-083573 | 6/1990 |
| JP | H02-244190 | 9/1990 |
| JP | H03-156488 | 7/1991 |
| JP | H03-200282 A | 9/1991 |
| JP | H04-020086 | 2/1992 |
| JP | H04-051595 | 2/1992 |
| JP | H04-056822 A | 2/1992 |
| JP | H05-042853 A | 2/1993 |
| JP | H05-080344 | 4/1993 |
| JP | H05-050428 | 7/1993 |
| JP | H06-021018 | 3/1994 |
| JP | H03 001011 | 6/1994 |
| JP | H06-348364 | 12/1994 |
| JP | 07-099394 * | 4/1995 |
| JP | H07-199180 | 8/1995 |
| JP | H07-261187 | 10/1995 |
| JP | H07-281184 | 10/1995 |
| JP | H07-044577 | 11/1995 |
| JP | H07-044579 | 11/1995 |
| JP | H08-211964 | 8/1996 |
| JP | H09-026753 | 1/1997 |
| JP | S59-020273 | 4/1997 |
| JP | 09-114391 | 5/1997 |
| JP | 09114391 | 5/1997 |
| JP | H09-146466 | 6/1997 |
| JP | H09-199875 | 7/1997 |
| JP | H09-297542 | 11/1997 |
| JP | H09-311319 | 12/1997 |
| JP | 10-96921 | 4/1998 |
| JP | 10-190272 | 7/1998 |
| JP | H10-301095 | 11/1998 |
| JP | 11-006998 | 1/1999 |
| JP | 11-085319 | 3/1999 |
| KR | 2003-0080125 | 10/2003 |
| KR | 2003-0080126 | 10/2003 |
| WO | WO 96/27147 | 9/1996 |

OTHER PUBLICATIONS

Appln for McCartney, Richard, et al; The Primary Flight Instruments for the Boeing 777 Airplane; SPIE Vo. 2219 Cockpit Display; 1994; 13 pgs.

Appln for Smith-Gillespie, Robert D., et al; 777 LCD Backlight Life; SPIE Vo. 2219 Cockpit Display; 1994; 9 pgs.

Appln for Wood, Ted; Honeywell Militarized Color Liquid Crystal Displays for the F-16; SPIE Vo. 2734; 1994; 12 pgs.

Kawamoto, Masahiro, et al; Color-Liquid-Crystal Display for Automotive Instrument Panel (English Trnsltn included); 14 pgs.

Prosecution History of European Patent No. 0880049; 184 pgs.

Prosecution History of European Patent No. 297 12775; 53 pgs.

Prosecution History of European Patent No. 297 21 272.9; 45 pgs.

Prosecution History of European Patent No. 2 319 110; 124 pgs.

Prosecution History of European Patent No. 2 761 798; 22 pgs.

Prosecution History of European Patent No. 197 3 006; 44 pgs.
Prosecution History of European Patent No. 9800814-7; 52 pgs.
Prosecution History of European Patent No. 0 880 049; 53 pgs.
Prosecution History of European Patent No. 00115576; 32 pgs.

English language translation dated Apr. 9, 1999 of attachment to Japanese Patent Appln. H09-135610, (17 pgs.).

* cited by examiner

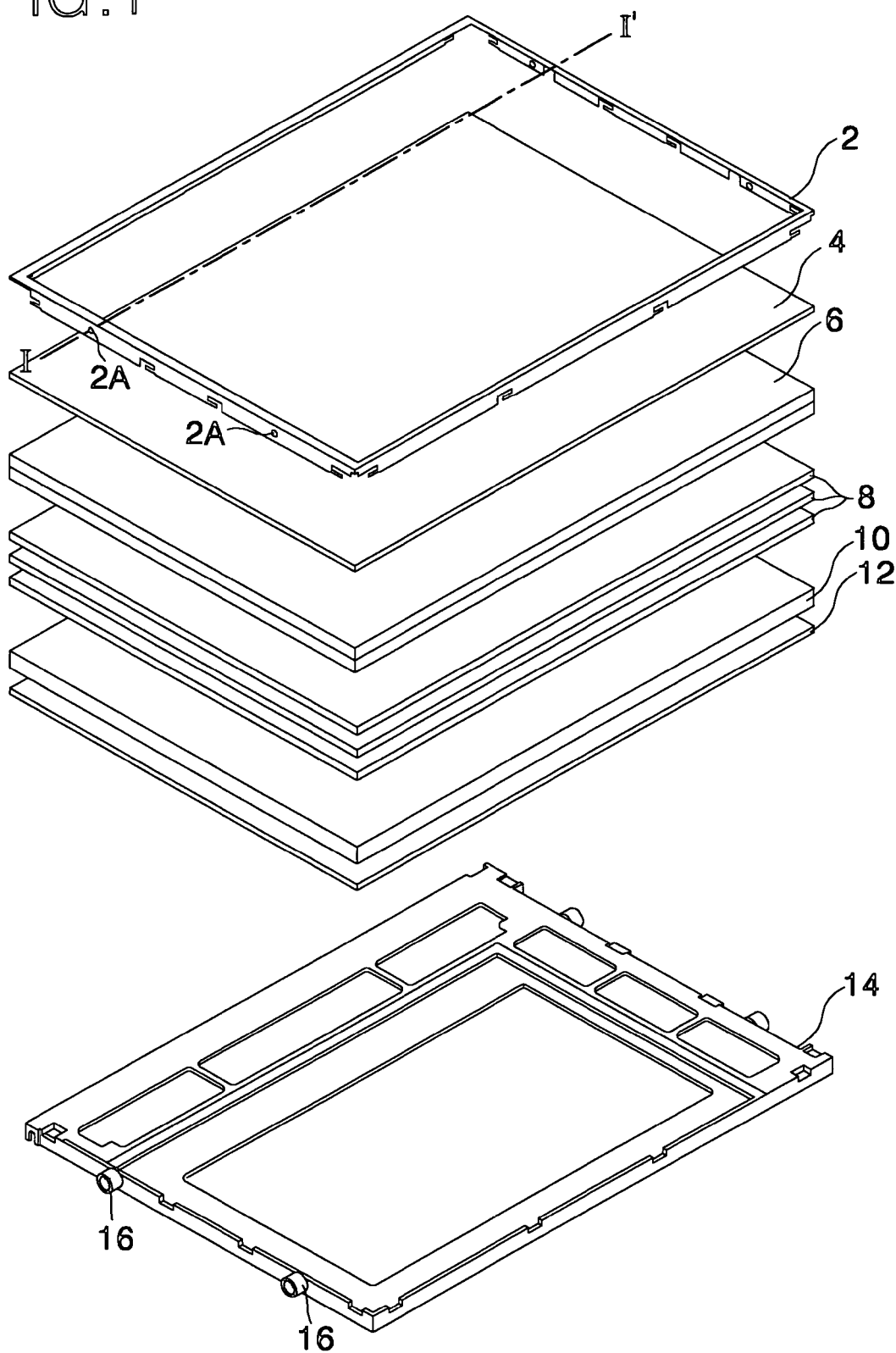

CASE FOR LIQUID CRYSTAL DISPLAY

RELATED APPLICATIONS

This application claims the benefit of Korean Patent Application Nos. 1998-14409 and 1998-38118, filed on Apr. 22, 1998 and Sep. 15, 1998, respectively, which are hereby incorporated by reference in their entirety.

This is a continuation-in-part of application Ser. No. 09/145,357, filed Sep. 1, 1998 now U.S. Pat. No. 5,926,237, which is a continuation of application Ser. No. 08/888,164, filed Jul. 3, 1997, now U.S. Pat. No. 5,835,139.

BACKGROUND OF THE INVENTION

1. Field of the Invention

This invention relates to a liquid crystal display (LCD) device having a liquid crystal display module, and more particularly to a liquid crystal display apparatus that is suitable for a side mounting engagement in which a liquid crystal display device is engaged to a portable computer and the like.

2. Description of the Related Art

Generally, a conventional liquid crystal display device includes an LCD module, a drive circuit for driving the LCD, and a case. The LCD module includes a liquid crystal panel having liquid crystal cells arranged in a matrix pattern between two glass substrates and a backlight unit for irradiating a light onto the liquid crystal panel. Also, the LCD module is provided with optical sheets for setting upright a light directed from the backlight unit to the liquid crystal panel. Such liquid crystal panel, backlight unit and optical sheets may be assembled in an integral structure and be protected from an exterior impact so as to prevent a light loss. In this regard, in one instance a case or a frame has been provided for a liquid crystal display. The case is formed in such a manner as to surround the backlight unit and optical sheets including the edge of the liquid crystal panel. Such a liquid crystal display device is mounted in a portable information processing apparatus, such as a portable computer (e.g., a notebook computer), for use as a display apparatus. In order to make a portable information processing apparatus having a slim structure, a side mounting system has been used, for example, in which a liquid crystal display device has mounting means, such as a screw hole, at the side edge perpendicular to the display surface. The liquid crystal display device is fixed to the side surface of the portable information processing apparatus, preferably at a side surface.

As shown in FIG. 1, the side mounting liquid crystal display case includes, for example, a frame 14 made from a plastic material, and a top case or frame 2, which is made from a metallic material, to engage with the frame 14. The frame 14 supports a reflective sheet 12, a backlight and guide 10, optical sheets 8, a liquid crystal panel 6 and a polarizing sheet 4. Fastening elements such as inserts 16 having a female screw thread are inserted to each side surface of the frame 14 using a suitable method such as a high frequency welding technique. The top case 2 is installed in such a manner as to surround the side surfaces of the optical sheets 8, the backlight and guide 10 and the frame 14 including the edge and the side surfaces of the liquid crystal panel 6. Engaging holes 2A are formed on each side wall of the top case 2 in such a manner as to correspond to the inserts 16 of the frame 14. Further, as shown in FIG. 2A, the top case 2 covers the frame 14, the upper part of which the reflective sheet 12, the backlight and guide 10, the optical sheets 8 and the liquid crystal panel 6, disposed sequentially, are secured. In this case, the top case 2 surrounds the edge of the liquid crystal panel 6 to protect the liquid crystal panel 6 from external impact. The upper polarizing plate 4 is positioned on and at the center of the surface of the liquid crystal panel 6.

As shown in FIG. 2A, the liquid crystal display device having the above-mentioned structure is mounted on a cover 1 of the notebook computer and the like by means of a screw 18, for example, which passes through the engaging hole 2A of the top case 2 from the side surface of the cover 1 surrounding the display device, and is engaged with the insert 16.

In the side mounting liquid crystal display device employing the insert 16, the frame 14 may have a large width because the insert 16 has a certain length. For example, the insert 16 may have a length of at least 2.5 mm so as to be inserted to the side surface of the frame 14 as shown in FIG. 2A using the high frequency welding technique. The frame 14 surrounding the insert 16 also may have a thickness of at least 1.1 mm. Accordingly, the side edge of a case for the side mounting liquid crystal display device has a width more than 3.2 mm. As a result, the liquid crystal display device of the side mounting system has a large width. Also, in the side mounting liquid crystal display case employing the insert 16, the side wall of the frame 14 may be damaged during an additional insertion process. If the frame 14 contains a broken side wall or crack, it is difficult to repair and is most likely discarded. This results in a higher manufacturing cost of the liquid crystal display device, including the liquid crystal module.

SUMMARY OF THE INVENTION

An object of the present invention to provide a side mounting liquid crystal display case that is easy to make, has a reduced thickness and reduces the manufacturing cost of the liquid crystal display device.

A further object of the present invention is to provide a liquid crystal display case for making a slimmer liquid crystal display device.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a flat panel display device comprises an outer casing having a side wall; a first frame that supporting the flat panel display, the first frame having a first side panel; a second frame configured to engage the first frame with the flat panel display therebetween, the second frame having a second side panel, the second side panel defining an opening; and a bracket between the first and second side panels of the first and second frames, respectively, the bracket having a projecting part configured to be fitted in the opening of the second side panel of the second frame, wherein the frame is secured to the side wall of the outer casing with a fastener coupled to the bracket through the outer casing.

According to another embodiment of the present invention, a portable display device comprises a flat panel display that displays images; a controller connected to the flat panel display for controlling the images; an outer casing that encloses at least a part of the flat panel display, the outer casing having at least one side wall; a frame that supports the flat panel display, the frame having at least one side panel; a top case configured to engage the frame with the flat panel display therebetween, the top case having at least one side panel and the side panel defining an opening; and a bracket disposed between the side panels of the frame and the top case, the bracket having a projecting part configured to be fitted in the opening of the side panel of the top case, wherein the frame is secured to the side wall of the outer casing with a fastener coupled to the bracket through the outer casing.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 1 is an exploded perspective view showing a liquid crystal display device;

DETAILED DESCRIPTION OF THE PREFERRED EMBODIMENTS

A flat panel display device comprises an outer casing having at least one side wall, a frame that supports a liquid crystal display panel and has at least one side panel, a top case configured to engage the frame with the liquid crystal panel therebetween and a bracket disposed between the side panels of the frame and the top case. The top case has at least one side panel and the side panel defines an opening. The bracket has a projecting part configured to be fitted in the opening of the side panel of the top case. The frame is secured to the side wall of the outer casing with a fastener coupled to the bracket through the outer casing.

According to another aspect of the present invention, the side panel of the top case includes at least one protrusion projecting adjacent to the opening in the side panel. The bracket defines at least one receptacle sized to receive the protrusion. In this regard, the receptacle and the projecting part are arranged in the bracket to fit the protrusion and the opening, respectively, of the top case.

According to another aspect of the present invention, the side panel of the top case includes two protrusions projecting on opposite sides of the opening. The bracket defines two receptacles sized to receive corresponding protrusions.

According to another aspect of the present invention, the side panel of the top case includes at least one receptacle formed adjacent to the opening in the side panel. The bracket defines at least one protrusion sized to fit in the receptacle. The protrusion and the projecting part are arranged in the bracket to fit the receptacle and the opening, respectively, of the top case.

According to another aspect of the present invention, the projecting part of the bracket includes a threaded inner surface configured to engage the fastener. Moreover, the frame includes a groove defined to receive the bracket, the groove being formed opposite of the opening of the side wall of the top case.

According to another aspect of the present invention, the side panel of the frame has a recess configured to slidingly receive the bracket. The recess of the side panel defines an aperture, in which the projecting part of the bracket is aligned with the aperture of the recess. Preferably, the projecting part of the bracket includes a threaded inner surface configured to engage the fastener. Moreover, the top case projects a lever in the opening of the side panel, the lever pressing the projecting part of the bracket to hold the bracket in the recess. At least one hook is projecting in the recess from the side panel of the frame to securely engage the bracket in the recess.

Figure 3:
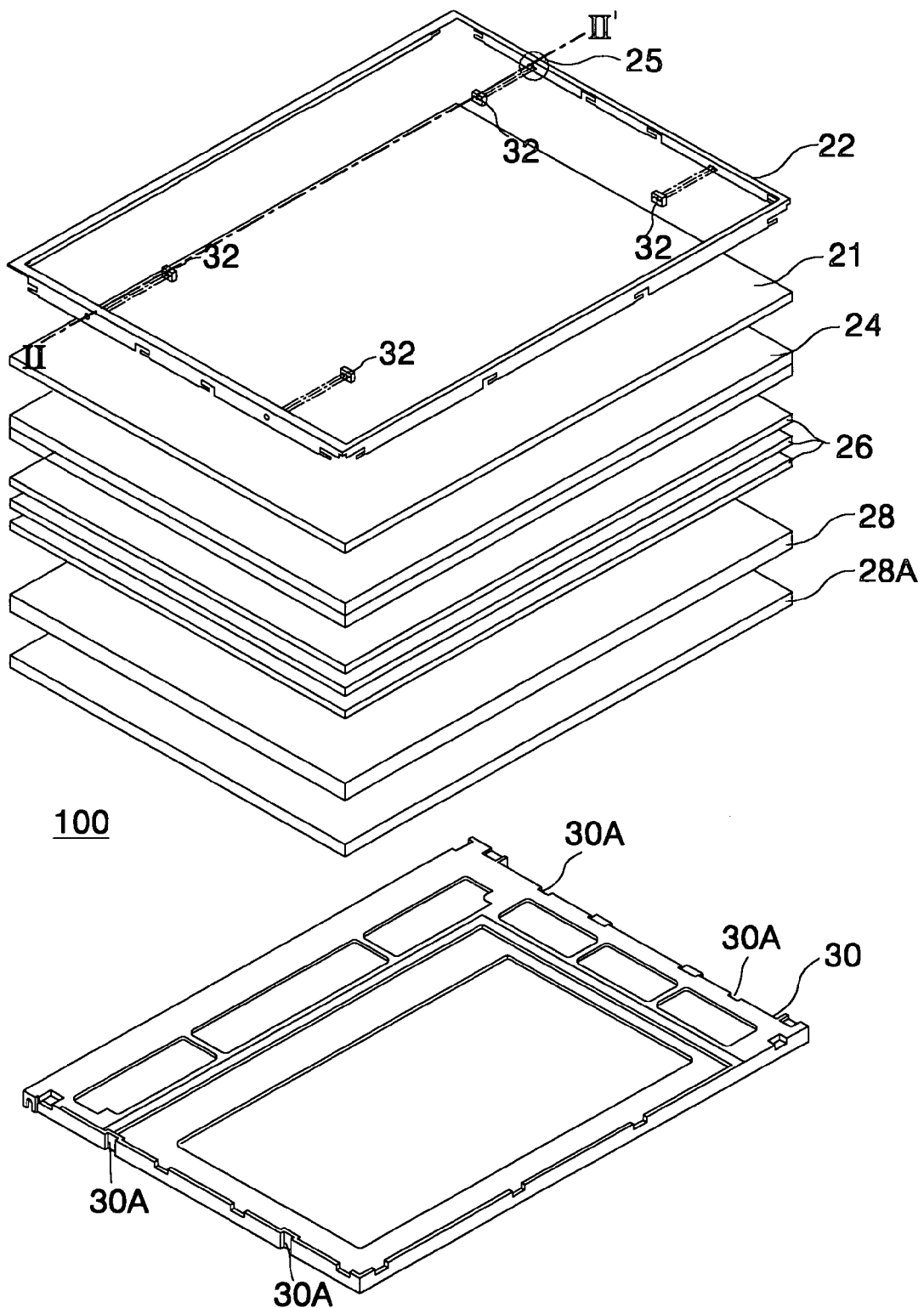
FIG. 3 is an exploded perspective view showing a liquid crystal display device according to a first embodiment of the present invention.

Referring to FIG. 3, a liquid crystal display case 100 according to a first embodiment of the present invention includes a frame 30 for supporting the liquid crystal display device, a top case or frame 22 for receiving the frame 30 and preferably surrounding the liquid crystal display device, and a bracket 32 located between the frame 30 and the top case 22 to mount the liquid crystal display device to an external apparatus, such as a notebook computer. The liquid crystal display case 100, according to the present invention, employs a side mounting system.

Figure 5A:
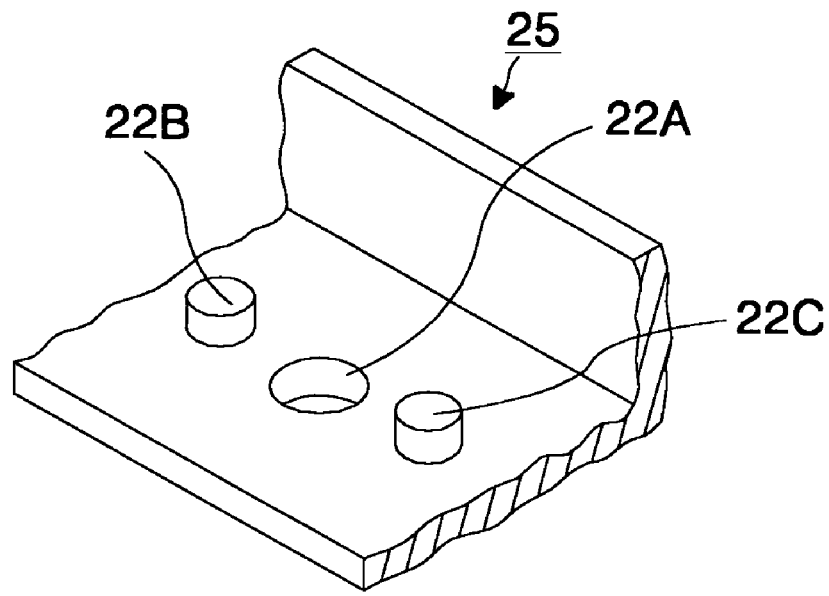
FIG. 5A is a detailed illustration of one embodiment of an engaging hole shown in FIG. 3.
Figure 5B:
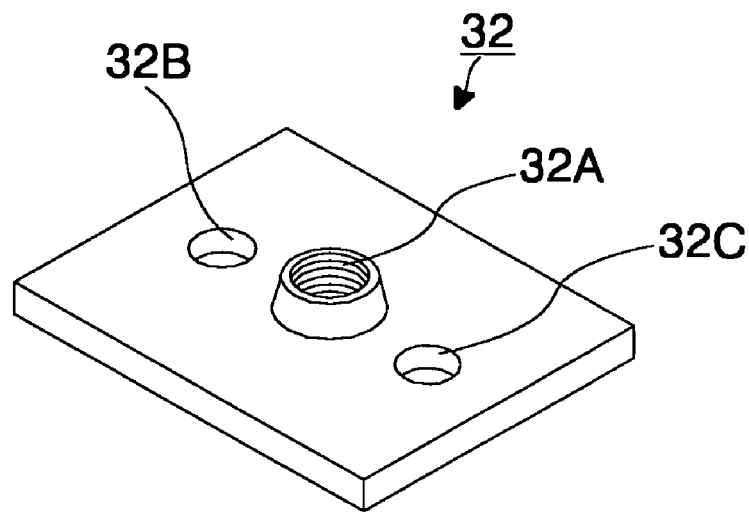
FIG. 5B is a detailed illustration of one embodiment of a bracket shown in FIG. 3.

The structure for engaging the bracket 32 to the top case 22 will be described as follows. In the top case 22 as shown in FIG. 5A, a first engaging hole 22A is defined and engaging protrusions 22B and 22C are preferably formed at both sides of the first engaging hole 22A. The engaging protrusions 22B and 22C are preferably equally distanced from the first engaging hole 22A. Also, a female screw or screw hole 32A, preferably having a protruding semi-conical shape, is formed in the bracket 32 as shown in FIG. 5B. At both sides of the female screw on the bracket 32, there are defined second and third engaging holes 32B and 32C corresponding to the engaging protrusions 22B and 22C, respectively. The female screw 32A on the bracket 32 is used to mount the liquid crystal display device to the external apparatus, such as the notebook computer. The engaging protrusions 22B and 22C respectively engage the second and third engaging holes 32B and 32C by a spot-welding method or other suitable methods known to one of ordinary skill in the art. Also, the female screw 32A is inserted into the first engaging hole 22A on the top case 22 before a screw inserted into the female screw 32A. Furthermore, the bracket 32 engaged to the top case 22 is configured to be inserted into a groove 30A defined at the frame 30 to allow the top case 22 and the frame 30 to be mounted to the external apparatus.

Figure 4:
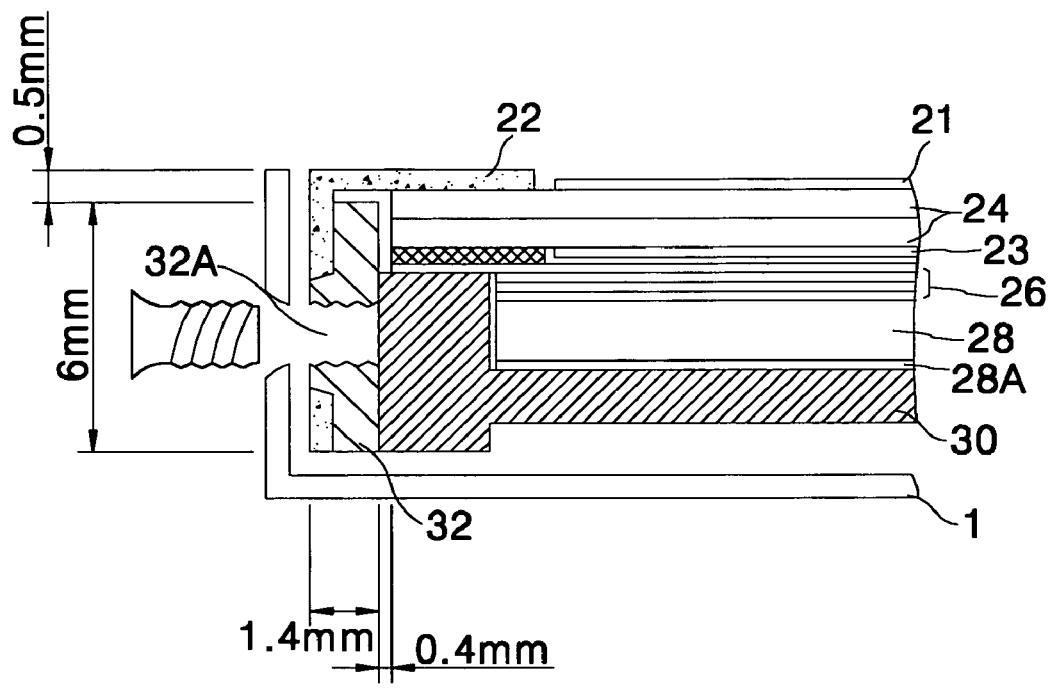
FIG. 4 is a cross-sectional view of the liquid crystal display device taken along line II-II' in FIG. 3.

Referring to FIG. 4, the liquid crystal display case 100 according to the present invention is assembled by inserting the bracket 32, which is coupled to the top case 22, into the groove 30A of the frame 30. In the assembled structure, there are sequentially arranged a reflective sheet 28A, a backlight plate 28, a backlight lamp (not shown), and diffusion and prism sheets 26 on the frame 30. On the sheets, sequentially arranged are a lower polarizing sheet 23, the liquid crystal panel 24 and an upper polarizing sheet 21. The top case 22 surrounds the edges of the liquid crystal panel 24, thereby protecting the liquid crystal panel 24 from external impact.

Figure 2A:
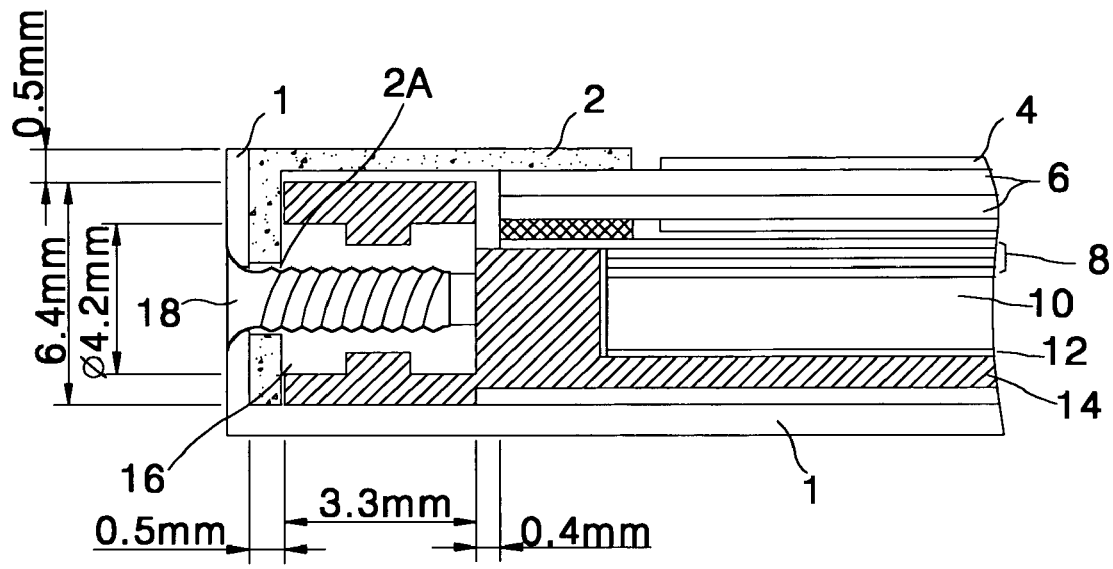
FIG. 2A is a cross-sectional view of the liquid crystal display device taken along line I-I' in FIG. 1.
Figure 2B:
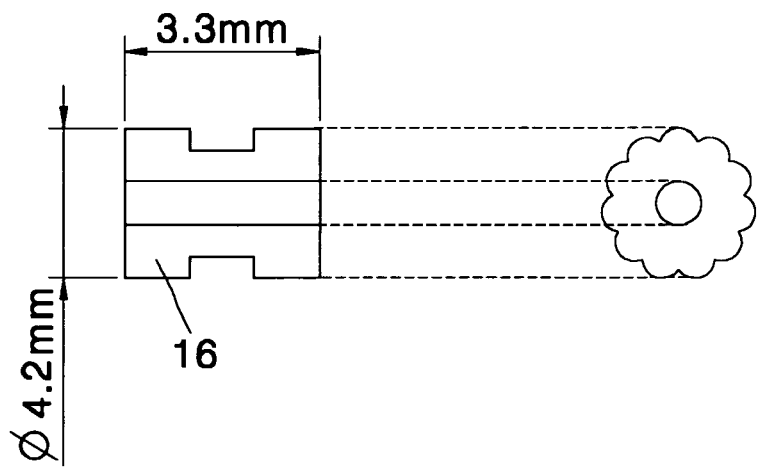
FIG. 2B is a sectional view of the inserter shown in FIG. 2A.

The bracket 32 engaged to the top case 22 is formed to a predetermined length and thickness. In the bracket 32, there is a female screw or thread 32A which has the protruding shape, as shown in FIG. 5B, and engages a top case 22 by the screw. The bracket 32 is preferably made with a metallic material to prevent cracks and damage due to an exterior impact, vibration or the like. Alternatively, the bracket 32 may be made with any suitably rigid material known to one of ordinary skill in the art. The size of the bracket 32 is minimized to maintain a minimal thickness and size. As a result, the liquid crystal display device according to the present invention has a reduced length and thickness. For example, if a bracket 32 having a thickness of 1.4 mm in accordance with the present invention is installed at both sides of the liquid crystal display device in lieu of the inserter 16 shown in FIG. 2B, the liquid crystal display device case reduces on the x-axis length of the liquid crystal display device by 2.4 mm. Also, the thickness of the liquid crystal display device is decreased by about 0.4 mm because the thickness (or height) of the frame 30, including the width of the bracket 32, is about 6 mm.

Figure 5C:
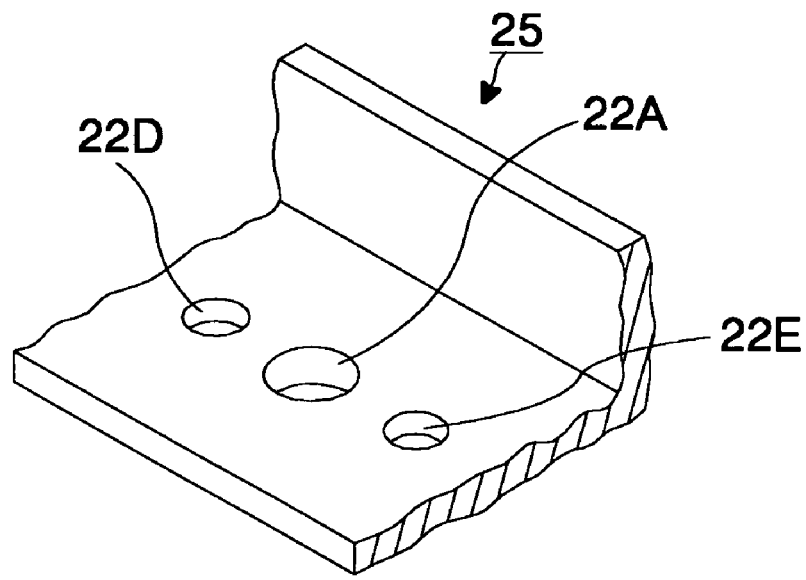
FIG. 5C is an alternative embodiment of FIG. 5A.
Figure 5D:
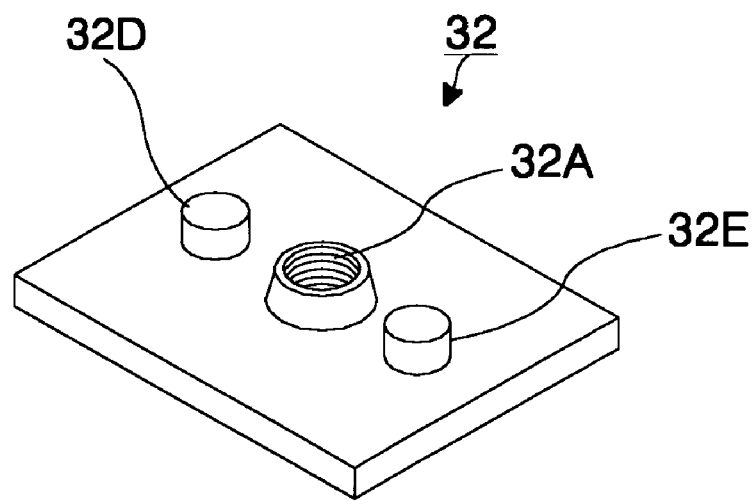
FIG. 5D is an alternative embodiment of the bracket shown in FIG. 5B.

Alternative embodiments of the present invention are shown in FIGS. 5C and 5D. In FIG. 5C, in lieu of the engaging protrusions 22B and 22C, two matching receptacles 22D and 22E are provided. Similarly, in FIG. 5D, in lieu of the engaging holes 32B and 32C, two matching engaging protrusions 32D and 32E are provided corresponding to the two matching receptacles 22D and 22E.

As shown in FIG. 4, the assembled liquid crystal display case 100 is coupled to the cover 1 by using screws. As screws are tightened, the top case 22 is securely pressed between the cover 1 and the bracket 32. The above-described liquid crystal display case 100 has been slimmed by inserting and engaging the bracket 32, which is secured to top case 22 in the groove 30A of the frame 30. Also, a damaged bracket 32 can be replaced during the manufacturing process without discarding the entire frame. As a result, the manufacturing cost for the liquid crystal display device is reduced.

Figure 6:
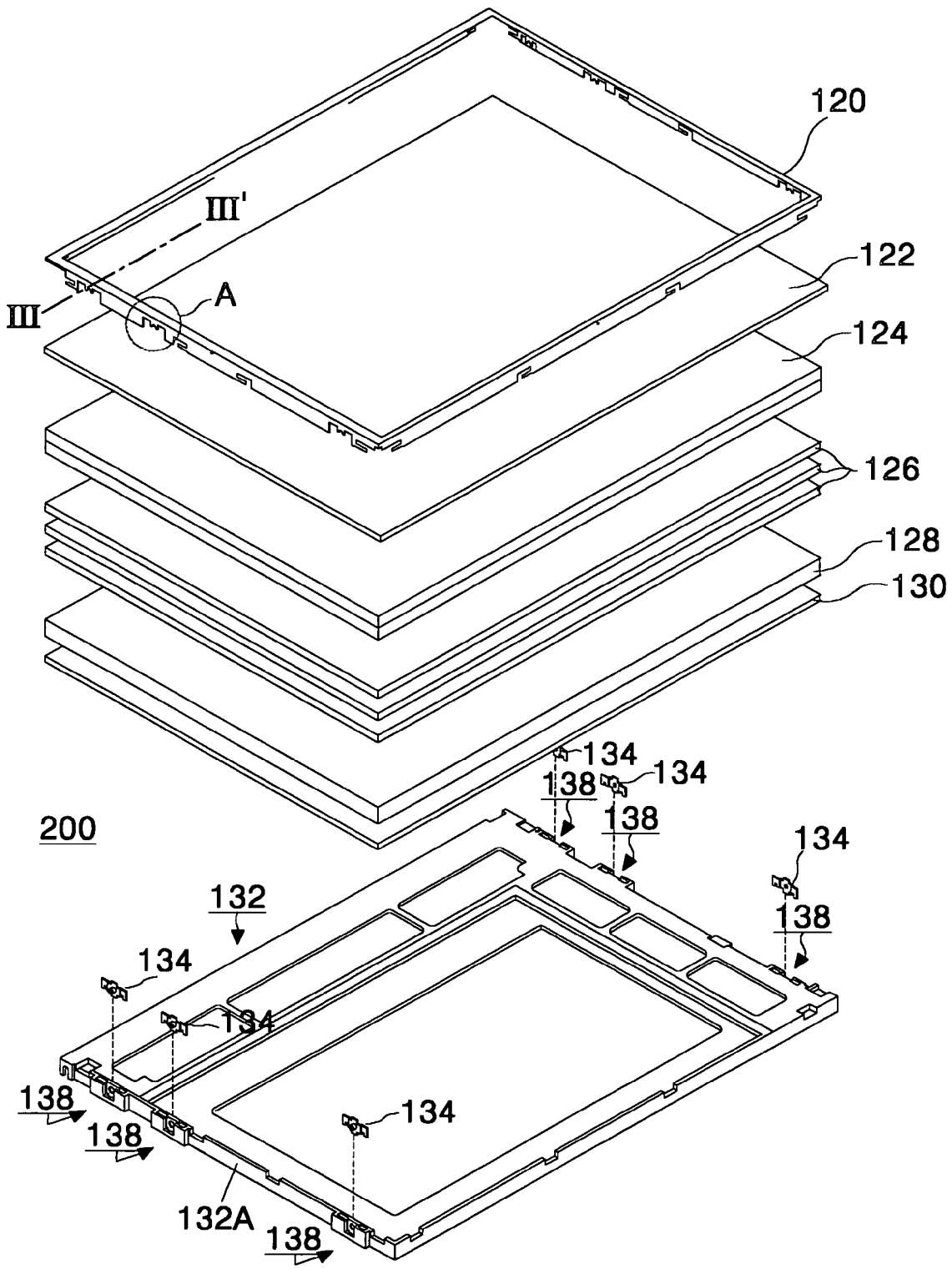
FIG. 6 is an exploded perspective view showing the structure of a liquid crystal display device according to a second embodiment of the present invention.

Referring to FIG. 6, a liquid crystal display device 200 is shown according to a second embodiment of the present invention. The liquid crystal display device 200 includes brackets 134 for securing the liquid crystal display device 200 to an exterior housing. A frame 132 supports a reflective sheet 130, a backlight and guide 128, optical sheets 126, a liquid crystal panel 124, and an upper polarizing plate 122. The top case 120 is installed in such a manner as to surround the edges and side surfaces of the liquid crystal panel 124 and the side surfaces of the optical sheets 126, the backlight and guide 128, the reflective sheet 130 and the frame 132. The brackets 134 are mounted on the side walls of the frame 132 and are fixed by means of a screw (not shown), for example, inserted into the side wall of the frame 132 through a side wall of a cover (not shown) of an external equipment (e.g., a notebook computer). A hinge arm may be inserted between the cover of the exterior equipment and the liquid crystal display device 200 to allow the liquid crystal display device 200 to pivot with respect to the base of the external equipment. Also, a mounting support member including a female screw is inserted between the liquid crystal display device 200 and the hinge arm to fill in a space between the notebook personal computer and the liquid crystal display device 200 or to correct a mismatch of the female screw.

Figure 7:
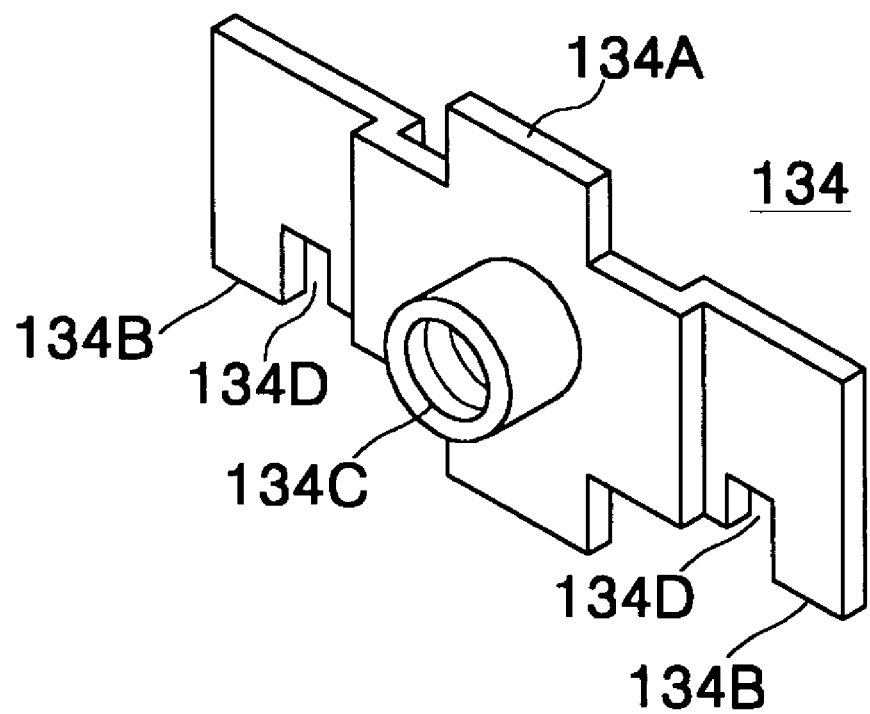
FIG. 7 is a detailed illustration of the bracket shown in FIG. 6.

As shown in FIG. 7, each bracket 134 includes a "+" shaped stator 134A, blades 134B extending outward from each side of the stator 134A, and a female screw or protruding thread 134C defined at the center of the stator 134A. The blades 134B are formed such that all of them are positioned at the rear side by their thickness with respect to the stator 134A. Guide grooves 134D are preferably defined at the lower side of the blades 134B. Threads defined on the inner side of the female screw 134C preferably extend to the rear side of the stator 134A to allow the screw to pass through the stator 134A.

Figure 8A:
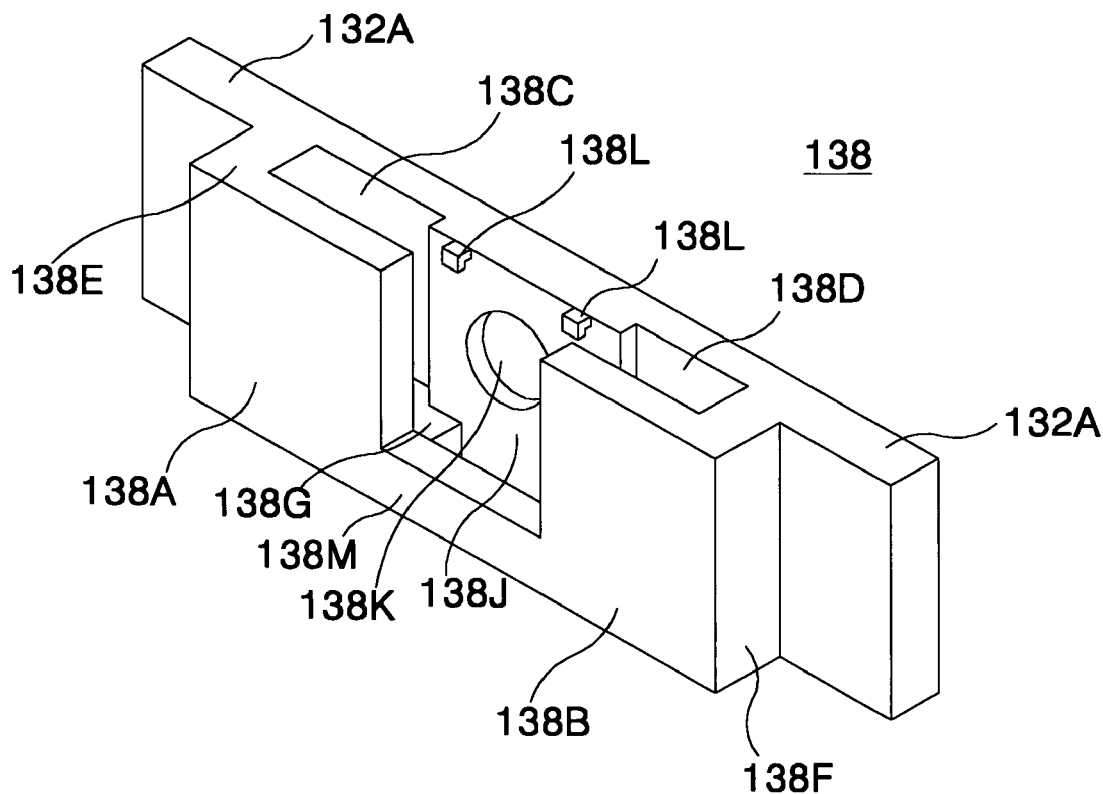
FIG. 8A is a detailed illustration of the engaging member shown in FIG. 6.
Figure 8B:
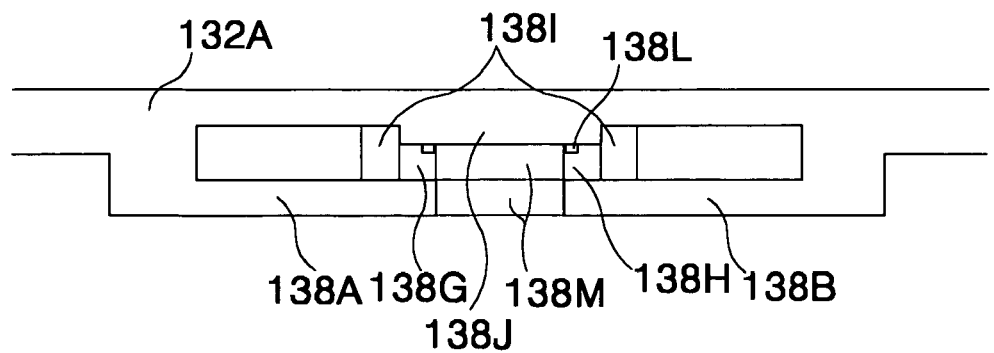
FIG. 8B is a detailed plan view of the engaging member shown in FIG. 6.

To mount such a bracket 134 in the frame 132, engaging members 138, as shown in FIGS. 8A and 8B, are defined at the side walls of the frame 132. Each engaging member 138 has first and second support side walls 138A and 138B positioned at a certain space protruding from the frame side wall 132A. The first and second support side walls 138A and 138B are positioned parallel to the frame side wall 132A to form first and second engaging gaps 138C and 138D. A part of the stator 134A and the blades 138B of the bracket 138 are inserted into the first and second engaging gaps 138C and 138D, respectively. The left edge of the first support side wall 138A is preferably connected to the frame side wall 132A by means of a first connecting rod 138E, and the right edge of the second support side wall 138B is preferably connected to the frame side wall 132A by means of a second connecting rod 138F. The lower edges of the first and second support side walls 138A and 138B are connected to the frame side wall 132A by means of third and fourth connecting rods 138G and 138H. The center of each connecting rod 138G and 138H is provided with suspended jaws 138I. The suspended jaws 138I are engaged with the guide grooves 134D of the bracket 134.

The engaging member 138 further includes a stepped face 138J protruding away from the frame side wall 132A. In this embodiment, the left edge of the projecting face 138J is opposite to the right edge of the first support side wall 138A, while the right edge of the projecting face 138J is opposite to the left edge of the second support side wall 138B. A female screw or thread 138K is located preferably at the center of the projecting face 138J. A screw 142 which passes through the top case 120 and the bracket 134 is received into the female screw 138K. Hooks 138L are formed at the left and right sides of the upper end of the projecting face 138J. The hooks 138L fix the necks of the stators 134A to the projecting face 138J. The lower end of the side surface of the opposed first and second support side walls 138A and 138B are connected to each other by means of a fifth connecting rod 138M. Through the fifth connecting rod 138M, the third connecting rod 138G is connected to the fourth connecting rod 138H.

Figure 9:
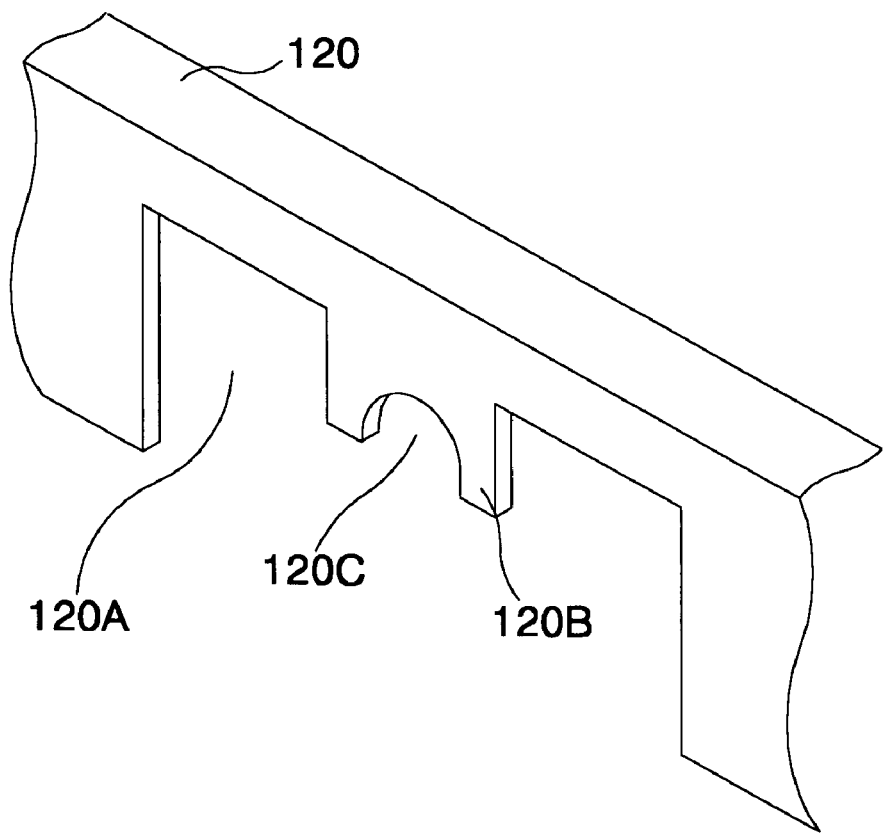
FIG. 9 is a detailed illustration of portion A of the top case shown in FIG. 6.

As shown in FIG. 9, the side wall of the top case 120 is provided with an engaging groove 120A that is adapted and constructed to engage the first and second support side walls 138A and 138B. The first and second support side walls 138A and 138B engaged with the engaging groove 120A are exposed through the opening of the engaging groove 120A. Also, the side wall of the top case 120 is provided with an engaging tag or lever 120B extending downward from the center of the upper end of the engaging groove 120A. A semicircular shaped through hole 120C is defined at the lower side of the engaging tag 120B. The female screw protrusion 134C of the bracket 134 is inserted into the through hole 120C. Engaging tags 120B are pressed against the bracket 134.

Figure 10:
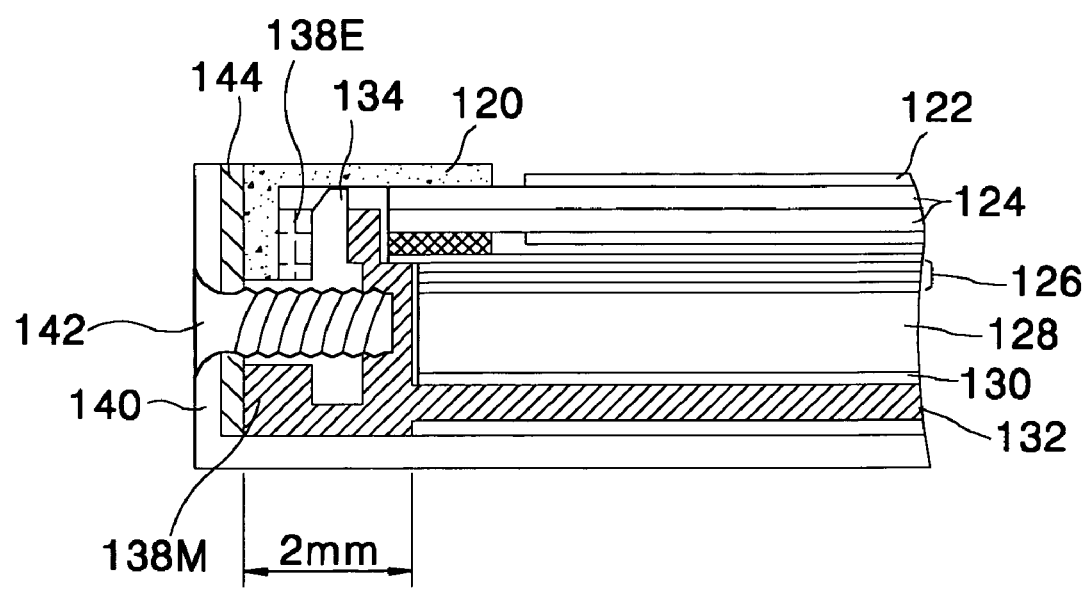
FIG. 10 is a sectional view of the liquid crystal display device taken along line III-III' in FIG. 6 where the liquid crystal display device is mounted to a housing such as a cover of notebook computer.

FIG. 10 is a sectional view of the liquid crystal display device taken along line III-III' in FIG. 6 where the liquid crystal display device is mounted on an exterior equipment, such as a notebook computer. On the upper part of the frame 132 there are sequentially disposed the reflective sheet 130, the backlight and guide 128, the optical sheets 126, the liquid crystal panel 124 and the upper polarizing plate 122. The edges of the upper surface of the liquid crystal panel 124 and the frame 132 and the side surface of the frame 132 are surrounded by the top case 120. The bracket 134 is positioned between the side wall of the top case 120 and the side surface of the frame 132. The female screw protrusion 134C of the bracket 134 is inserted and fixed to the engaging gap 138C, defined on the side wall 132A of the frame 132. The screw 142 is received through a cover 140 and a hinge arm 144 of the external equipment (e.g., notebook computer), the top case 120, and the bracket 134 and into the side wall 132A of the frame 132, thereby securing the liquid crystal display device to the side surface of the cover 140 of the notebook computer. Alternatively, the hinge arm 144 may not be used, in which case the screw 142 engages the cover 140 with the bracket 134. The liquid crystal display device is thus securely fastened to the cover 140.

The bracket 134 is preferably made from a metallic material or other suitable material so as to prevent damage due to external impact and vibration, etc. and/or an occurrence of a crack during the engagement of the screw 142. The bracket 134 made of a metallic material has a reduced thickness in comparison to the conventional insert. As a result, the liquid crystal display device, as well as the liquid crystal display case, has a narrow width. For example, when the bracket 134 is formed with a thickness of about 1.3 mm and installed on the side wall of the frame 132, the width of the frame is reduced by about 2.3 mm in comparison to when an insert having a length of 2.5 mm is used. Furthermore, as the thickness of the side wall of the frame 132 is reduced, the width of the frame 32 may be reduced. The bracket for mounting the exterior equipment of the liquid crystal display device according to the present invention is applicable to a wide range of display products including a reflective liquid crystal display device and a projective liquid crystal display device without a backlight unit. Other display flat panel, such as a PDP panel, may be used in the present invention.

As described above, according to the present invention, a mounting hole is formed in a state in which a bracket is engaged with the side wall of the frame, thereby securing the liquid crystal display device to the external equipment using the side mounting system. Also, the width of the liquid crystal display module can be reduced because the bracket has a reduced thickness. Moreover, the liquid crystal display device, as well as the notebook computer, can have a reduced thickness.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A flat panel display device having a flat panel display, comprising:
   an outer casing having a side wall;
   a first frame that supporting the flat panel display, the first frame having a first side panel;
   a second frame configured to engage the first frame with the flat panel display therebetween, the second frame having a second side panel, the second side panel defining an opening; and
   a bracket between the first and second side panels of the first and second frames, respectively, the bracket having a projecting part configured to be fitted in the opening of the second side panel of the second frame, wherein the frame is secured to the side wall of the outer casing with a fastener coupled to the bracket through the outer casing.

2. The flat panel display device of claim 1, wherein the second side panel of the second frame includes at least one protrusion projecting adjacent the opening in the second side panel, and wherein the bracket defines at least one receptacle sized to receive the protrusion, the receptacle and the projecting part being arranged in the bracket to engage the protrusion and the opening, respectively, of the second frame.

3. The flat panel display device of claim 2, wherein the second side panel of the second frame includes two protrusions projecting on opposite sides of the opening, and wherein the bracket defines two receptacles sized to receive corresponding protrusions.

4. The flat panel display device of claim 1, wherein the second side panel of the second frame includes at least one receptacle formed adjacent the opening in the second side panel, and wherein the bracket defines at least one protrusion sized to fit in the receptacle, the protrusion and the projecting part being arranged in the bracket to engage the receptacle and the opening, respectively, of the second frame.

5. The flat panel display device of claim 4, wherein the second side panel of the second frame includes two receptacles formed on opposite sides of the opening, and wherein the bracket defines two projections sized to fit in the corresponding receptacles.

6. The flat panel display device of claim 1, wherein the projecting part of the bracket includes a threaded inner surface configured to engage the fastener.

7. The flat panel display device of claim 1, wherein the frame includes a groove defined to receive the bracket, the groove being formed opposite of the opening of the side wall of the second frame.

8. The flat panel display device of claim 7, wherein
   the projecting part of the bracket includes a threaded inner surface configured to engage the fastener.

9. The flat panel display device of claim 7, wherein the second side panel of the second frame includes at least one protrusion projecting adjacent the opening in the second side panel, and wherein the bracket defines at least one receptacle sized to receive the protrusion, the receptacle and the projecting part being arranged in the bracket to engage the protrusion and the opening, respectively, of the second frame.

10. The flat panel display device of claim 1, the first side panel of the first frame having a recess configured to slidingly receive the bracket, the recess of the first side panel defining an aperture, wherein the projecting part of the bracket is aligned with the aperture of the recess.

11. The flat panel display device of claim 10, wherein the projecting part of the bracket includes a threaded inner surface configured to engage the fastener.

12. The flat panel display device of claim 10, wherein the second frame projects a lever in the opening of the side panel, the lever pressing the projecting part of the bracket to hold the bracket in the recess.

13. The flat panel display device of claim 10, wherein at least one hook is projecting in the recess from the first side panel of the first frame to securely engage the bracket in the recess.

14. The flat panel display device of claim 13, wherein the second frame projects a lever in the opening of the second side panel, the lever pressing the projecting part of the bracket to hold the bracket in the recess.

15. A portable display device comprising:
a flat panel display that displays images;
a controller connected to the flat panel display for controlling the images;
an outer casing that encloses at least a part of the flat panel display, the outer casing having at least one side wall;
a frame that supports the flat panel display, the frame having at least one side panel;
a top case configured to engage the frame with the flat panel display therebetween, the top case having at least one side panel and the side panel defining an opening; and
a bracket disposed between the side panels of the frame and the top case, the bracket having a projecting part configured to be fitted in the opening of the side panel of the top case, wherein the frame is secured to the side wall of the outer casing with a fastener coupled to the bracket through the outer casing.

16. The display unit of claim 15, wherein the side panel of the top case includes at least one protrusion projecting adjacent the opening in the side panel, and wherein the bracket defines at least one receptacle sized to receive the protrusion, the receptacle and the projecting part being arranged in the bracket to engage the protrusion and the opening, respectively, of the top case.

17. The display unit of claim 16, wherein the side panel of the top case includes two protrusions projecting on opposite sides of the opening, and wherein the bracket defines two receptacles sized to receive corresponding protrusions.

18. The display unit of claim 15, wherein the side panel of the top case includes at least one receptacle formed adjacent the opening in the side panel, and wherein the bracket defines at least one protrusion sized to fit in the receptacle, the protrusion and the projecting part being arranged in the bracket to engage the receptacle and the opening, respectively, of the top case.

19. The display unit of claim 18, wherein the side panel of the top case includes two receptacles formed on opposite sides of the opening, and wherein the bracket defines two projections sized to fit in the corresponding receptacles.

20. The display unit of claim 15, wherein the projecting part of the bracket includes a threaded inner surface configured to engage the fastener.

21. The display unit of claim 15, wherein the frame includes a groove defined to receive the bracket, the groove being formed opposite of the opening of the side wall of the top case.

22. The display unit of claim 21, wherein the projecting part of the bracket includes a threaded inner surface configured to engage the fastener.

23. The display unit of claim 21, wherein the side panel of the top case includes at least one protrusion projecting adjacent to the opening in the side panel, and wherein the bracket defines at least one receptacle sized to receive the protrusion, the receptacle and the projecting part being arranged in the bracket to engage the protrusion and the opening, respectively, of the top case.

24. The display unit of claim 15, the side panel of the frame having a recess configured to slidingly receive the bracket, the recess of the side panel defining an aperture, wherein the projecting part of the bracket is aligned with the aperture of the recess.

25. The display unit of claim 24, wherein the projecting part of the bracket includes a threaded inner surface configured to engage the fastener.

26. The display unit of claim 24, wherein the top case projects a lever in the opening of the side panel, the lever pressing the projecting part of the bracket to hold the bracket in the recess.

27. The display unit of claim 24, wherein at least one hook is projecting in the recess from the side panel of the frame to securely engage the bracket in the recess.

28. The display unit of claim 27, wherein the top case projects a lever in the opening of the side panel, the lever pressing the projecting part of the bracket to hold the bracket in the recess.

29. A flat panel display device, comprising:
an outer casing having at least one side wall;
frame means for supporting a flat panel display, the frame means having at least one side panel;
top case mean for engaging the frame means with the flat panel display therebetween, the top case means having at least one side panel and the side panel defining an opening; and
bracket means for securing the top case means and the frame means to the outer casing, the bracket means being disposed between the side panels of the frame means and the top case means, the bracket means having a projecting part configured to be fitted in the opening of the side panel of the top case, wherein the frame means is secured to the side wall of the outer casing with a fastening means coupled to the bracket means through the outer casing.

30. A method of manufacturing a flat panel display device having a flat panel display, comprising the steps of:
forming an outer casing having a side wall;
forming a first frame that supporting the flat panel display, the first frame having a first side panel;
forming a second frame configured to engage the first frame with the flat panel display therebetween, the second frame having a second side panel, the second side panel defining an opening; and
forming a bracket between the first and second side panels of the first and second frames, respectively, the bracket having a projecting part configured to be fitted in the opening of the second side panel of the second frame, wherein the frame is secured to the side wall of the outer casing with a fastener coupled to the bracket through the outer casing.

31. The method of claim 30, wherein the second side panel of the second frame includes at least one protrusion projecting adjacent the opening in the second side panel, and wherein the bracket defines at least one receptacle sized to receive the protrusion, the receptacle and the projecting part being arranged in the bracket to engage the protrusion and the opening, respectively, of the second frame.

32. The method of claim 31, wherein the second side panel of the second frame includes two protrusions projecting on opposite sides of the opening, and wherein the bracket defines two receptacles sized to receive corresponding protrusions.

33. The method of claim 30, the first side panel of the first frame having a recess configured to slidingly receive the bracket, the recess of the first side panel defining an aperture, wherein the projecting part of the bracket is aligned with the aperture of the recess.

34. The method of claim 33, wherein the projecting part of the bracket includes a threaded inner surface configured to engage the fastener.

35. The flat panel display device of claim 2, wherein the second side panel of the second frame includes one of a first protrusion and a first receptacle adjacent the opening in the second side panel, and wherein the bracket includes one of a second receptacle and a second protrusion corresponding to the first protrusion and the first receptacle, respectively.

* * * * *